March 6, 1956  C. E. BEARD  2,737,181
MEANS FOR PLACING ELASTIC BANDS
Filed Jan. 17, 1955
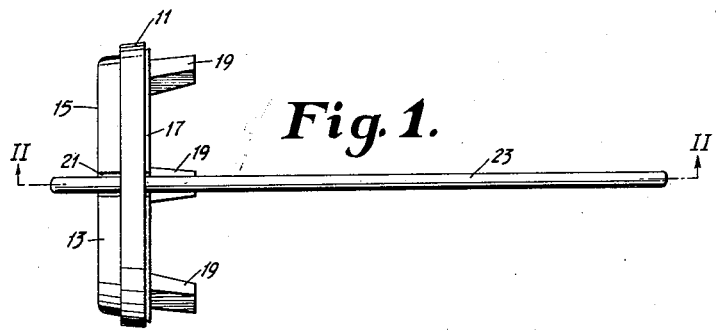
Fig. 1.
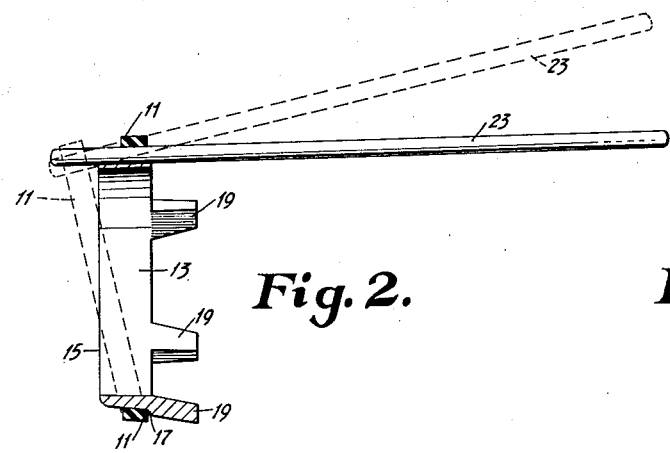
Fig. 2.   Fig. 5.
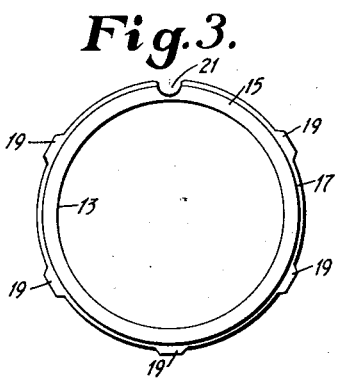 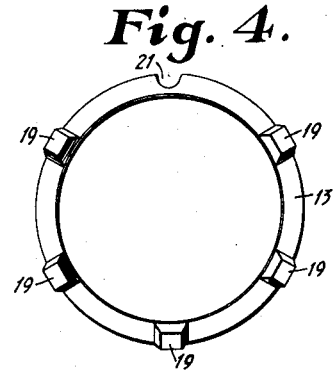
Fig. 3.  Fig. 4.
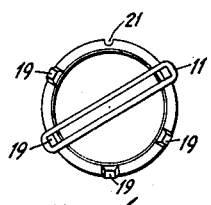 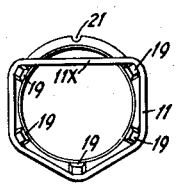 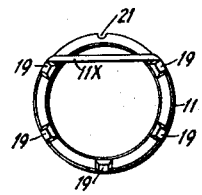
Fig. 6.  Fig. 7.  Fig. 8.
INVENTOR
CHESTER E. BEARD

United States Patent Office 2,737,181
Patented Mar. 6, 1956

2,737,181

MEANS FOR PLACING ELASTIC BANDS

Chester E. Beard, Memphis, Tenn.

Application January 17, 1955, Serial No. 482,109

5 Claims. (Cl. 128—303)

This invention relates to certain new and useful improvements in means for placing elastic bands, particularly for use in connection with the treatment of live stock, as for dehorning, castration or docking.

It has heretofore been found that the various operations mentioned may be satisfactorily accomplished by transferring to the animal member, the removal of which is desired, a strong elastic band of normally minor dimension and preferably formed as of rubber or other suitable elastic material. Such a band, when placed, as for example adjacent the base of the horn of cattle, and left in position for a limited period, as in the nature of a few days, will satisfactorily destroy the member by cutting off circulation and cause it to be removed from the animal.

There have been numerous attempts to provide means for placing such strong elastic bands upon animal members of the character mentioned, but such prior devices have involved relatively complicated mechanisms of a highly specialized nature and have proven inefficient and commercially unsatisfactory.

The present invention is directed to a simple and efficient means for transferring a strong elastic band into desired treatment position with the utmost of efficiency. The present means primarily relate to a combination of an expander ring including mounting legs and a band placing lever removably associated with the ring element.

The principal object of the present invention is to provide a new and novel means for placing an animal treatment elastic band in treatment position upon an animal member.

A further object of the invention is to provide such means which include a ring-like element having mounting legs for facilitating the mounting of an elastic band upon the ring-like element and including a tapered body portion, the taper of which faces away from the mounting legs for the ready removal of the band from the ring-like element to transfer to the animal member.

A further object of the invention is to provide in combination with such a ring-like element a band-placing lever pin and a channelway formed in the ring-like element for removably receiving the lever pin.

A further object of the invention is to generally improve the design, construction and efficiency of means for placing animal treatment elastic bands.

The means by which the foregoing and other objects of the present invention are accomplished and the manner of their accomplishment will readily be understood from the following specification upon reference to the accompanying drawings, in which:

Fig. 1 is a side elevational view of the elements of the present invention assembled for use.

Fig. 2 is a sectional view taken as on the line II—II of Fig. 1.

Fig. 3 is an end view of the ring element of the invention as seen from its leading or transfer edge.

Fig. 4 is a face view of the opposite face of the ring element as seen from its trailing or ring-receiving face.

Fig. 5 is a perspective view of the elastic band employed herein prior to mounting upon the ring element; and Figs. 6, 7 and 8 are views similar to Fig. 4 on a reduced scale illustrating successive steps of mounting the band of Fig. 5 upon the ring element of Fig. 4.

Referring now to the drawings in which the various parts are indicated by numerals, it will be seen that the present invention provides a simple means for receiving an elastic or rubber band 11 which is employed for transferring to an animal member in order to effect treatment thereof.

In the treatment of animals as for dehorning or emasculation by castration or for the docking of tails, bands, such as the band 11, are employed, having a normal inner opening of a diameter substantially smaller than the animal part upon which it is to be placed. Such bands must be expanded to a size greater than that of the animal part, must be guided into position surrounding the animal part, preferably adjacent the base thereof, and deposited or transferred to the animal part where the natural contraction of the elastic material of which the band is formed applies a uniformly high pressure to the animal part, effecting interruption of circulation and causing the animal part outwardly from the band to atrophy and ultimately drop off.

For receiving and maintaining a band 11 in expanded condition and for guiding the band to proper use position in such condition the present invention provides a ring-like member 13. The ring-member 13 includes a substantially annular body. The outer surface of the ring-member 13 converges toward the inner surface thereof so as to taper ring 13 substantially from edge to edge with the leading edge 15 of ring member 13 being of less external diameter than the trailing edge of ring 13 and preferably being rounded, as best shown in Figs. 1 and 2.

Adjacent its trailing edge ring 13 is provided with an annular rim 17 projecting radially outwardly a minor distance beyond the surface of ring 13. Projecting oppositely away from the trailing edge of ring 13 are a plurality of mounting legs 19, the legs 19 preferably flaring somewhat outwardly from the trailing edge of ring 13. Preferably the legs 19 are substantially equally spaced apart about the circumference of the trailing edge of ring 13 with the exception that between two of the legs 19 the circumferential space is substantially twice the space between the remaining mounting legs. Substantially equidistant between the two widely spaced mounting legs ring 13 is channelled substantially from edge to edge as at 21, the channel being of size to loosely receive an end portion of a band placing lever pin 23. As can readily be recognized, the inner opening of ring 13 is of a diameter to permit easy placement over the animal member upon which it is desired to position the band 11.

In the use of the device the band 11 may be quickly expanded onto ring 13 as through the steps illustrated in Figs. 6, 7 and 8. As can there be seen the band 11 is first stretched between two of the mounting legs substantially diametrically opposed. It may then be successively expanded over the remaining mounting legs to the position shown in Fig. 7 and subsequently band 11 may be turned over one thickness onto ring 13 throughout a majority of its length, as shown in Fig. 8, leaving a portion 11X of band 11 spanning between the more widely spaced legs 19 and adjacent channel 21.

Pin 23 may then be inserted beneath the span of band 11 and extended into channel 21 and the span 11X of band 11 may then be lifted onto ring 13, tightly holding the lever pin 23 in position, as shown in Figs. 1 and 2. The tool is thus assembled for use in the desired animal treatment. The annular rim 17 is effective to prevent accidental movement of the mounted band 11 beyond the trailing edge of ring 13 and thus the band 11 is positively mounted upon ring 13 in expanded condition and with the lever pin arranged to facilitate transfer of the band.

As thus assembled the tool, consisting of the ring 13, band 11 and lever 23, may be mounted upon the animal part to be treated. The pin 23 projecting in a trailing direction substantially beyond the trailing edge of ring 13 provides a convenient handle for introducing the assembled tool to the animal part, including a minimum of obstruction to such introduction, since its projection does not extend substantially radially beyond the confines of the dimension of the ring member. The rounded leading edge of ring 13 facilitates guiding of the tool into desired position. When thus positioned a simple lever movement of the trailing portion of pin 23, as shown in dotted lines in Fig. 2, away from ring 13 causes band 11 to spring from ring 13 into confining pressure-exerting engagement with the animal part being treated. Thereafter ring 13 and lever 23 may be readily removed from the animal part, the band 11 having then been accurately placed in the exact position desired.

It will be seen that the present device provides a simple yet highly efficient means for placing the elastic band upon the animal part with the utmost accuracy and with minimum difficulty. It further provides, through the arrangement of the spaced and rigidly fixed mounting legs, a means for quickly receiving the band and retaining same in expanded condition in preparation of transfer to the animal part.

I claim:

1. In means for positioning elastic bands on animal parts for treatment purposes, a substantially annular ring having an inner diameter in excess of the size of the animal part to be treated and having a body portion tapering from trailing edge to leading edge, said body portion being adapted to receive and retain an elastic band in expanded condition, said leading edge being rounded to facilitate passage of an elastic band therebeyond, an annular radially projecting rim adjacent said trailing edge and limiting movement of an elastic band from said body portion beyond said trailing edge, a plurality of mounting legs projecting in a trailing direction from said trailing edge, said mounting legs being circumferentially spaced apart and flaring outwardly away from said trailing edge and being adapted to successively receive portions of an elastic band during mounting of same on said ring, said ring being channelled from edge to edge to provide a channel underlying an elastic band when mounted on said body portion, and a lever pin removably inserted in said channel and projecting in a trailing direction from said ring, said pin being tightly held in said channel by a said band mounted on said body and being rockable therein to lever a said band from said ring.

2. In means for positioning elastic bands on animal parts for treatment purposes, a substantially annular ring having an inner diameter in excess of the size of the animal part to be treated and having a body portion tapering from trailing edge to leading edge, said body portion being adapted to receive and retain an elastic band in expanded condition, said ring being channelled from edge to edge to provide a channel underlying an elastic band when mounted on said body portion, and a lever pin removably inserted in said channel and projecting in a trailing direction from said ring, said pin being tightly held in said channel by a said band mounted on said body and being rockable therein to lever a said band from said ring.

3. Means for treating animal parts, comprising a substantially annular ring having an inner diameter in excess of the size of the animal part to be treated and having a body portion tapering from trailing edge to leading edge, said body portion being adapted to receive and retain an elastic band in expanded condition, an elastic band removably mounted in expanded condition on said body portion, said leading edge being rounded to facilitate passage of said elastic band therebeyond, an annular radially projecting rim adjacent said trailing edge and limiting movement of said elastic band from said body portion beyond said trailing edge, a plurality of mounting legs projecting in a trailing direction from said trailing edge, said mounting legs being circumferentially spaced apart and flaring outwardly away from said trailing edge and being adapted to successively receive portions of said elastic band during mounting of same on said ring, said ring being channelled from edge to edge to provide a channel underlying said elastic band, and a lever pin removably inserted in said channel and projecting in a trailing direction from said ring, said pin being tightly held in said channel by said band and being rockable therein to lever said band from said ring.

4. Means for treating animal parts, comprising a substantially annular ring having an inner diameter in excess of the size of the animal part to be treated and having a body portion tapering from trailing edge to leading edge, said body portion being adapted to receive and retain an elastic band in expanded condition, an elastic band removably mounted in expanded condition on said body portion, said leading edge being rounded to facilitate passage of said elastic band therebeyond, an annular radially projecting rim adjacent said trailing edge and limiting movement of said elastic band from said body portion beyond said trailing edge, said ring being channelled from edge to edge to provide a channel underlying said elastic band, and a lever pin removably inserted in said channel and projecting in a trailing direction from said ring, said pin being tightly held in said channel by said band and being rockable therein to lever said band from said ring, the projecting portion of said pin providing a handle for said means.

5. Means for treating animal parts, comprising a substantially annular ring having an inner diameter in excess of the size of the animal part to be treated and having a body portion tapering from trailing edge to leading edge, said body portion being adapted to receive and retain an elastic band in expanded condition, an elastic band removably mounted in expanded condition on said body portion, said ring being channelled from edge to edge to provide a channel underlying said elastic band, and a lever pin removably inserted in said channel and projecting in a trailing direction from said ring, said pin being tightly held in said channel by said band and bing rockable therein to lever said band from said ring, whereby to provide means for accurately positioning said band in constricting engagement upon an animal part to be treated.

No references cited.